June 16, 1931.  E. JACOBS  1,810,608
ANIMAL TRAP
Filed April 19, 1928
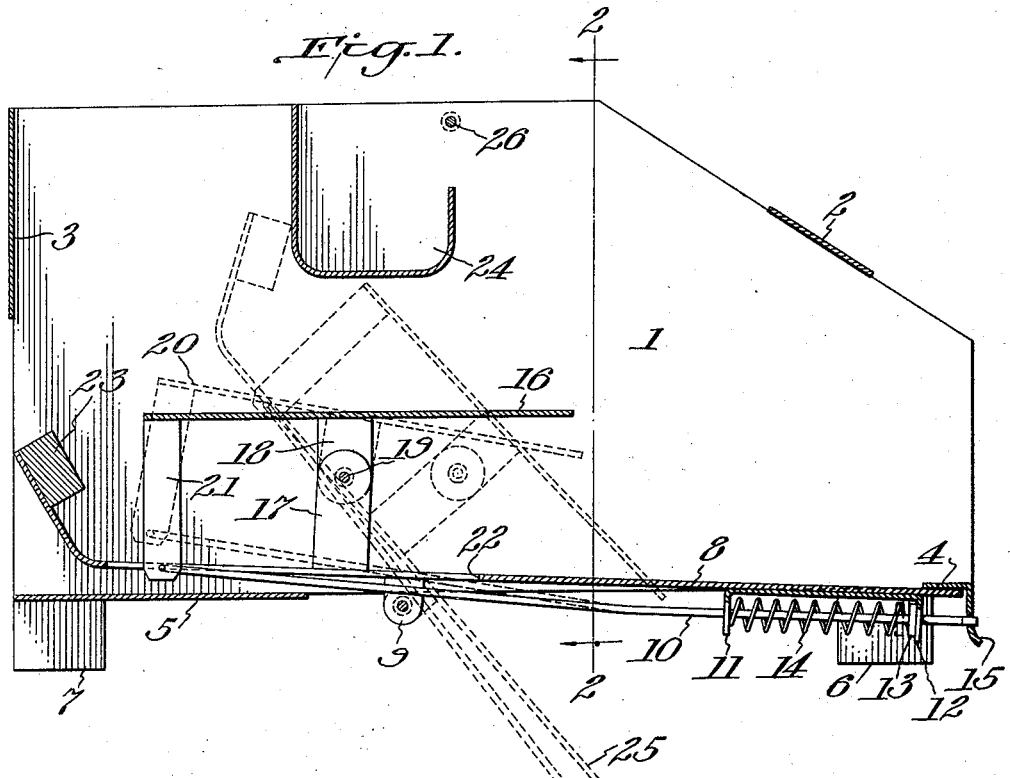
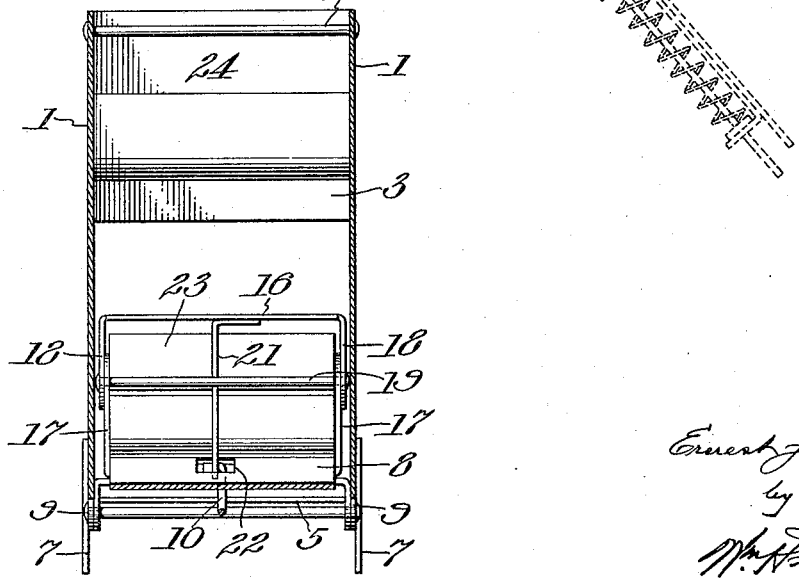
Inventor
Ernest Jacobs
by
Attorney Patented June 16, 1931

1,810,608

UNITED STATES PATENT OFFICE

ERNEST JACOBS, OF MILESVILLE, SOUTH DAKOTA

ANIMAL TRAP

Application filed April 19, 1928. Serial No. 271,342.

The object of this invention is to produce a practical trap, of simple but compact and relatively economical construction, for catching and destroying mice, rats, gophers and other small animals.

The invention consists of an animal trap, having suitable side walls, between which is pivoted a counterweighted tiltable bottom carrying an independently pivoted trigger releasing mechanism; the bait holder being located sufficiently far above the trigger-releasing mechanism to compel the animal to mount or bear upon the trigger-releasing mechanism, whereby the weight or force of the animal will tilt said mechanism on its pivot and release the trigger and the tiltable bottom and drop the animal into a receptacle beneath the trap in which it is destroyed or imprisoned, as I will proceed now to explain more fully and finally claim.

In the accompanying drawings illustrating the invention, in the several figures of which like parts are similarly designated, Figure 1 is a longitudinal section showing in full lines the parts in animal-receiving or normal position and in dotted lines the preliminary tilting of the trigger-releasing mechanism and the consequent tilting of the animal discharging bottom. Fig. 2 is a cross section on line 2—2 of Fig. 1.

The trap is designed to be used in connection with any sort of receptacle into which the animal is precipitated from the trap, as for drowning or imprisoning purposes; the trap itself being arranged above such container.

Excepting for the operated parts, the invention is shown in outline, and it will be understood that the exterior portions may be enclosed or partially enclosed, or otherwise finished.

As shown, there are parallel side walls 1, suitably connected, as by the cross-pieces 2 and 3 at top and back, and by the bottom cross-pieces 4 and 5; the legs 6 and 7 being applied for use in connection with the above-mentioned container.

The bottom 8 is pivotally mounted, at 9, intermediate its front and rear ends and between the side walls 1, so as to be tiltable on its pivot. This bottom carries a rod 10 extending longitudinally thereof and mounted in brackets 11 and 12 rigidly depending from the underside thereof. The rod has a collar 13 fixed thereon near its forward end and arranged to abut against the bracket 12. Between this collar and the bracket 11 is a light coiled spring 14 bearing against the bracket 11 and said collar so as to force the rod forwardly and enable its leading end to engage in a slot in the down-turned portion 15 of the forward bottom cross-piece 4, or an attachment thereto, and when so engaged the rod 10 serves as a detent or latch by which the bottom is held in normal position to receive an incoming animal and support its weight as it approaches the platform 16.

The platform 16 is pivotally mounted on standards 17, 17 rising from the bottom 8. The connection between the platform 16 and the standards may be effected by downwardly extending brackets 18 on the platform which are pivoted at 19 on the standards 17. The platform 16 has its pivotal axis located in the rear of the pivot 9 of the bottom, and while it moves with the bottom, it has in addition a separate tilting motion on the bottom, as indicated by the dotted lines 20. At its rear the platform 16 has a rigid depending arm 21 which extends downwardly through a slot 22 in the bottom, and this arm has the rod 10 connected to it at its bottom, so that the platform acts as a trigger for releasing the rod 10 from its engagement with the portion or keeper 15.

The bottom 8 is provided at its rear end with a counterweight 23 which serves to return the bottom and platform to normal position.

Above the platform 16 is a bait box or holder 24, which is inaccessible from the bottom 8 and thereby tempts the animal to place its weight on the platform 16 to reach it. When the animal's weight is placed on this platform 16, the platform tilts on its pivot 19, as shown by the dotted lines 20, and by so doing the arm 21 withdraws the rod 10 from the keeper and so releases the bottom, as indicated by the dotted lines 25, and discharges the animal from the trap into the container, in which it may be destroyed, as by drowning or imprisoning. As soon as the animal is thus discharged from the trap, the counter-weight 23 serves to return the movable parts into the normal position, shown by full lines, in readiness to receive another animal.

As will be observed, the bait box is not only arranged above the tiltable parts to a height to compel the animal to exert itself to get at the bait, but the bait is accessible only with difficulty.

Not only is the bait rendered practically inaccessible by the construction and location of the bait box, but this inaccessibility may be increased by a transverse bar 26 located above the front of the bait box and connecting the side walls 1.

As will be understood from the foregoing, the part 8 is a tiltable bottom and carries the trigger-releasing mechanism 16 and 21, which is actuated by the entrapped animal to permit the tilting of the bottom to discharge the animal from the trap to its impending death, after which the counter-weight 23 reacts into normal position and the engagement of the rod 10 with its keeper under the impulse of the spring 14.

The forward end of the bottom 8 is arrested in its upward motion by the transverse member 4, as shown in Fig. 1.

Undue tilting of the bottom may be arrested by contact with the back of the bait box or holder, as indicated in dotted lines in Fig. 1.

It will be understood that with the bottom relieved of the weight of the animal the counter-weight not only serves to return the platform and bottom to closed position, but in doing so, the spring 14 of the rod or detent automatically acts to restore the platform 16 to the normal position shown in full lines in Fig. 1.

Variations in details of construction are permissible within the principle of the invention and the claims following.

What I claim is:—

1. An animal trap, having suitable enclosing walls, a tiltable bottom pivotally mounted intermediate its front and rear ends and between said walls and having depending brackets on its lower forward portion, a rod extending lengthwise of the bottom and mounted in said brackets, a spring arranged on the rod and engaging one of the brackets and the forward portion of the rod, a keeper fixed on one of said walls and engaged by said rod, a counterweight mounted on the rear end of the tiltable bottom, said bottom provided with a longitudinal slot, a tiltable platform mounted upon the bottom at the rear of the pivotal axis of said bottom and having a depending arm rigid therewith, and extending through said slot and connected directly with the rear end of the rod, said platform having an initial tilting movement on said bottom to release the rod from said keeper, by the immediate action of said rigid depending arm on said rod, after which the bottom and tiltable platform tilt together to discharge the trapped animal, the counterweight and spring serving thereafter to restore the tiltable bottom and platform to normal position upon the discharge of the animal from the bottom.

2. An animal trap, having suitable enclosing walls, a tiltable bottom pivotally mounted intermediate its front and rear ends and between said walls and having depending brackets on its lower forward portion, a longitudinally extended rod mounted in said brackets, a spring arranged on the rod and engaging one of the brackets and the forward portion of the rod, a keeper fixed on one of said walls and engaged by said rod, a counterweight mounted on the rear end of the tiltable bottom, a tiltable platform mounted upon the bottom at the rear of the pivotal axis of said bottom and having a rigid depending arm connected directly with said rod, said platform having an initial tilting movement on said bottom to release the rod from said keeper by the immediate action of said rigid depending arm on said rod, after which the bottom and tiltable platform tilt together to discharge the trapped animal, the counterweight and spring serving thereafter to restore the tiltable bottom and platform to normal position upon the discharge of the animal from the bottom.

In testimony whereof I have hereunto set my hand this 16th day of April, A. D. 1928.

ERNEST JACOBS.